United States Patent [19]

Shigemi

[11] Patent Number: 4,495,447
[45] Date of Patent: Jan. 22, 1985

[54] DC-DC CONVERTER CIRCUIT

[75] Inventor: Igarashi Shigemi, Tokyo, Japan

[73] Assignee: Sato Koki Company Ltd., Tokyo, Japan

[21] Appl. No.: 266,645

[22] Filed: May 26, 1981

[30] Foreign Application Priority Data

Jun. 8, 1980 [JP] Japan .............................. 55-111405[U]
Jun. 8, 1980 [JP] Japan .............................. 55-111406[U]
Jun. 8, 1980 [JP] Japan .............................. 55-111407[U]
Dec. 6, 1980 [JP] Japan .............................. 55-82481[U]

[51] Int. Cl.³ ............................................ H05B 37/00
[52] U.S. Cl. ................................ 315/241 P; 315/276; 315/221
[58] Field of Search ............... 315/241 P, 241 R, 221, 315/DIG. 7, 276; 331/112; 363/16, 18

[56] References Cited

U.S. PATENT DOCUMENTS 3,491,281  1/1970  Penn ................... 331/112 X
3,629,648  12/1971  Brown et al. ............ 315/221 X
4,082,984  4/1978  Iwata .................. 315/241 P
4,404,497  9/1983  Takematsu ............... 315/241 P Primary Examiner—David K. Moore
Attorney, Agent, or Firm—Donald D. Mon; David O'Reilly

[57] ABSTRACT

A DC-DC converter circuit particularly for use in a photographic flash light emitting device for producing high DC voltage from a low DC voltage such as a battery. Heretofore, the converter transformer of such a circuit has three coils, i.e. a primary coil to be connected to a low DC source, a secondary coil to produce high voltage and a feedback coil for feeding feedback current to the base of a chopping transistor. The purpose of this invention is to eliminate the need for a feedback coil by feeding current from said high voltage in the secondary coil to the base of a transistor.

3 Claims, 8 Drawing Figures

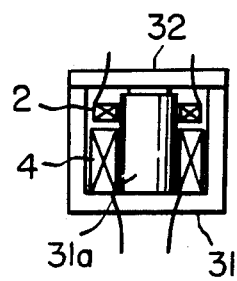
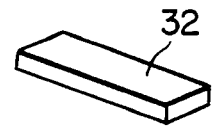
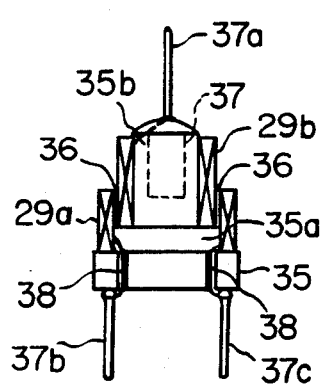
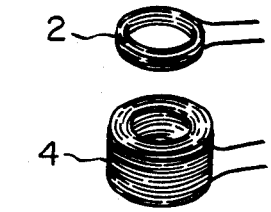
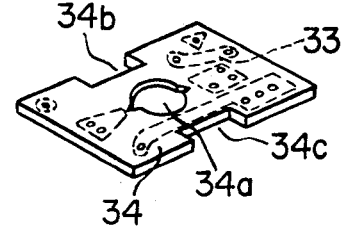
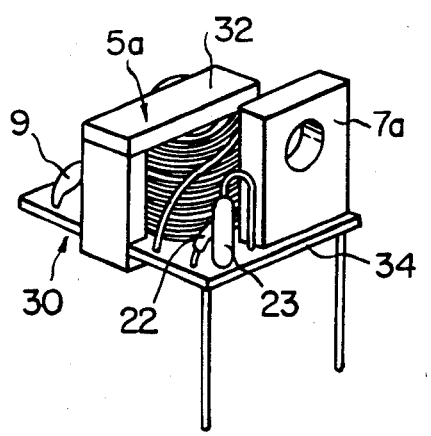
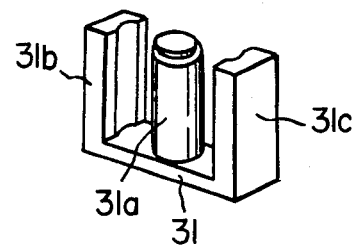

DC-DC CONVERTER CIRCUIT

BACKGROUND OF THE INVENTION

This invention relates to a DC - DC converter circuit and more particularly to a converter circuit used with a photographic flash light emitting device, a converter transformer, a solid state device and a trigger transformer.

Heretofore, the converter transformer has three coils, namely a primary coil to be connected to low DC voltage source (i.e. battery), a secondary coil for producing high voltage which is rectified by a rectifier such as a diode to a DC current at high voltage, and a feedback coil for producing a transistor control signal to be fed to the base of a transistor for a chopping operation on the current through said primary coil. Moreover a conventional converter transformer is difficult to manufacture and insulate because the secondary coil is wound around the primary coil. Also it needs attachment means such as a bolt, nut, screw for fixing it to a base plate. The trigger transformer in a conventional device also has similar difficulties in manufacturing and insulation.

BRIEF SUMMARY OF THE INVENTION

One object of this invention is to eliminate the above drawbacks and provide a simpler converter circuit, a transformer and device, and a trigger transformer.

Another object of this invention is to provide a DC - DC converter circuit in which current from a high voltage coil is fed to the base of a transistor as feedback current and construct a simpler oscillator circuit having a simpler converter transformer.

Yet another object of this invention is to provide a DC - DC converter device in which the converter transformer is fixed to a base plate having a printed circuit pattern eliminating the attaching means.

Still another object of this invention is to provide a trigger transformer for a photographic flash light emitting device in which a primary coil and a secondary coil are insulated by an air gap (i.e. clearance).

This invention is not limited to a photographic device only and the principle of the invention other devices such as illuminating by a flash light, a foot light, a device in a theatre etc.

The above and other objects of the invention will be fully understood from the following detailed description and the accompanying drawings, in which:

BRIEF DESCRIPTION OF THE DRAWINGS

FIG. 5 is a cross sectional view of a transformer used in said embodiment;

FIG. 6 is a cross sectional view of trigger coil used in the embodiment of FIG. 4;

FIG. 7 is a perspective view of a transformer device for use in said invention;

FIG. 8 is an exploded perspective view of the transformer device shown in FIG. 7.

DETAILED DESCRIPTION OF THE DRAWINGS

Figure 1:
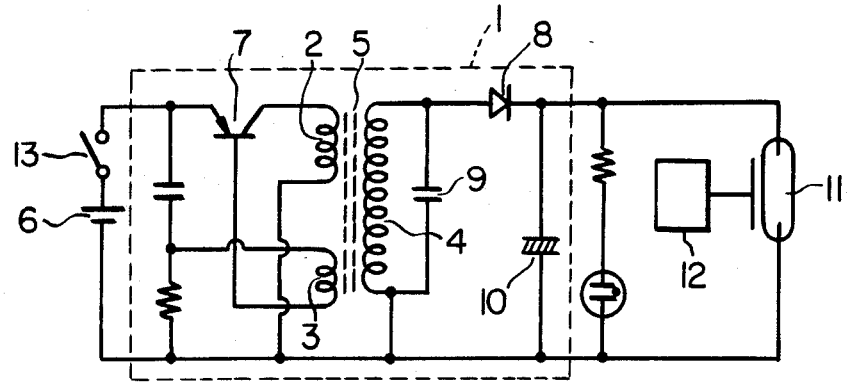
FIG. 1 is an electric circuit from the prior art.

In the prior art, a converter circuit 1 employs a converter transformer 5 having two primary coils 2 and 3 and one high voltage secondary coil 4 as shown in FIG. 1. The output or base feedback voltage of primary coil 3 is added to the base of transistor 7 connected between primary coil 2 and battery electric source 6 for chopping control.

In FIG. 1, rectifier 8 is connected to condenser 9 of small capacity such as 100 pF for protecting it. Condenser 10 is of large capacity such as 200 pF–600 pF for storing electric charges, while 11 is a flash lamp, 12 is a trigger circuit and 13 is a switch for electric source 6. These parts are standard with the usual flash circuit.

In the device shown in FIG. 1, transformer 5 needs three coils which becomes expensive.

Figure 2:
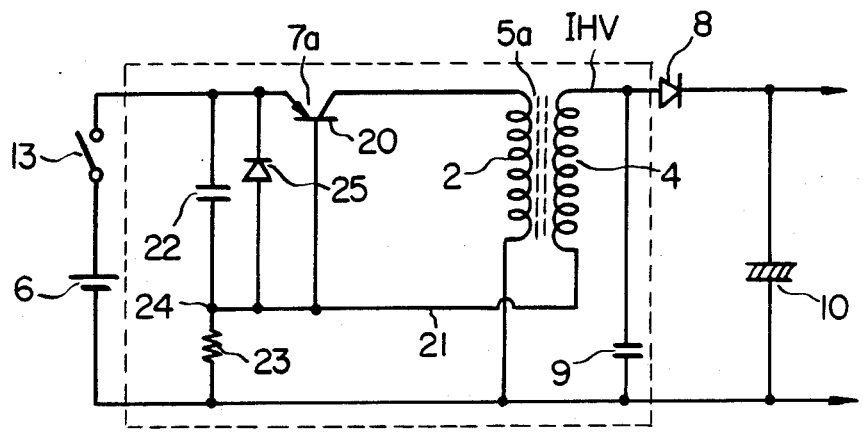
FIG. 2 is an electric circuit according to an embodiment of this invention.

FIG. 2 is an electric circuit illustrating an embodiment of this invention using the same reference numerals for the same parts as FIG. 1.

In this invention, transformer 5a has only a primary coil 2 and secondary coil 4. A transistor 7a of high sensitivity such as a 2SB772 is connected between primary coil 2 and battery electric source 6. The base 20 of the transistor 7a is connected to the earth side of high voltage coil 4 through line 21 and to the middle point 24 of series circuit consisting of condenser 22 and 30K ohm resistor 23.

Figure 3:
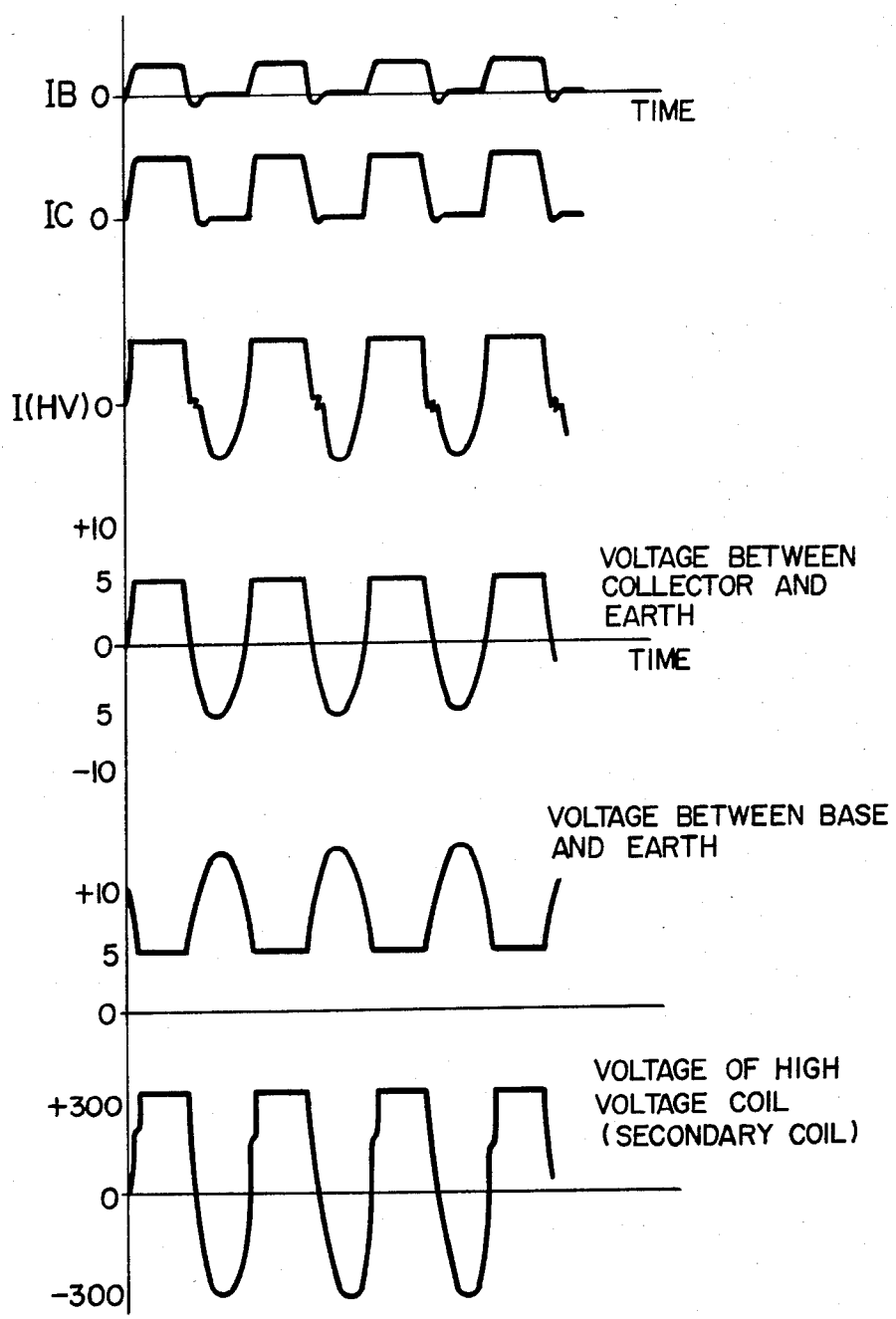
FIG. 3 shows graphs of the electrical outputs at several points in the circuit shown in FIG. 2.

Operation of this device is as follows: Upon closing of power switch 13, current IB shown in FIG. 3 flows from electric source 6 to the emitter and base 20 of transistor 7a, through resistor 23, and communicates with emitter to collector connection in transistor 7a. A current IC proportional to said current IB flows into coil 2 and a small current IHV of high voltage is generated in coil 4.

If the currents IB and IC turn from a peak positive value to peak negative value, current IHV also changes to peak negative value, and the negative current flows through condenser 9, electric source 6, switch 13 to the base 20 and emitter of transistor 7a in a reverse direction and cancels the positive current from source 6. This cuts the communication between emitter and collector in transistor 7a and currents IB, IC fall to zero. Therefore the transistor performs an ON, OFF operation and a pulse current IC shown in FIG. 3 flows in coil 2, a pulse current IHV of high voltage is generated in coil 4, and the current IHV is rectified by rectifier circuit i.e. diode 8, and charged in main condenser 10 as DC high voltage.

As explained above, in this invention the current produced in the high voltage secondary coil is added to the base of the transistor as a feedback current and the coil 3 (FIG. 1) in the prior art device for base feedback is eliminated, so that the construction of the transformer becomes much simpler and lower in cost.

Figure 4:
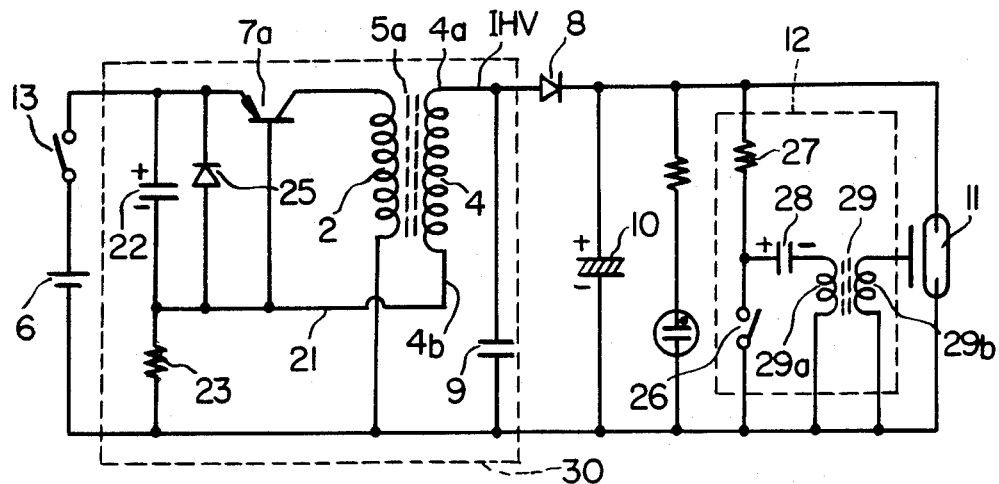
FIG. 4 is an electric circuit for a specific device according to another embodiment of this invention.

FIG. 4 is an electric circuit of a specific device according to another embodiment of this invention, with identical numerals used for identical parts. Diode 25 is a dumping diode for protecting transistor 7a. Circuit 30 is an oscillating circuit according to the present invention. FIG. 5 shows a cross sectional view of a transformer 5a according to this invention, in which primary coil 2 and secondary coil 4 are inserted on the center core 31a of an E type core 31 at upper and lower parts respectively, and an I shaped core 32 is attached to the open ends of said E type core 31. The construction of the core is not limited to a combination of an E type core and an I shaped core but the combination of an E type - E type or C type - I shaped are also possible in this invention. Said coils 2 or 4 are constructed of insulated wire and coil 2, 4, core 31, 32 are insulated from each other by suitable means and the whole device may be molded from insulating material. Said coils 2, 4 may be inserted into an insulating bobbin without using a core. Alternatively, coils 2, 4 are superimposed in upper and lower portions and molded together by insulating material.

In this device, coils 2, and 4 are formed in two layers in an upper and lower adjacency so that the diameter of the coils is smaller than that in which one coil 2 or 4 are formed around another coil 4 or 2 with an interposing insulating layer, and the size of the transformer in radial direction is reduced. Moreover, this transformer is relatively easy to manufacture because each coil 2, or 4 is independently wound.

As shown in FIG. 4, trigger circuit 12 is comprised of a syncro contact 26, resistor 27, trigger condenser 28 and trigger transformer 29 having primary and secondary coils 29a, 29b.

When syncro contact 26 is closed, electric charges in condenser 28 discharge through the contact 26 and primary coil 29a and a high voltage trigger is induced in secondary coil 29a. Flash lamp 11 is triggered and charges in large capacity condenser 10 discharge through the flash lamp 11 emitting light.

Heretofore, the trigger transformer is manufactured by winding a secondary coil on a bobbin in which a core is inserted. An insulating layer is formed on the secondary coil, and a primary coil is wound over the insulating layer. However, an insulating material such as plastic sheet, insulating paper, insulating mold layer and insulating step is needed.

FIG. 6 shows a cross section of an improved trigger transformer according to this invention. A body 35 has two columnar parts 35a, 35b of different diameter, a primary coil 29a is wound on larger column part 35a, a secondary coil 29b is wound on smaller column part 35b, and a clearance 36 formed between coil 29a and 29b. Core 37 having a lead wire 37a is inserted into columnar part 35b and the high voltage end of secondary coil 29b is connected to the lead wire 37a. Both ends of primary coil 29a are connected to two lead wires 37b, 37c respectively which are projecting from the lower face of body 35. The earth (i.e. ground) end of said coil 29b connected to the earth side lead wire 37c. Recesses 38, 38 are provided on the side of said body 35 for engagement by said lead wires 37b, 37c.

In this device, clearance 36 is formed between coils 29a and 29b because they are wound on columns of different diameter, so that an insulating material and the insulating step are not necessary. Moreover this trigger transformer is simple to manufacture oecause each coil 29a, 29b is independently wound.

FIGS. 7, 8 show a specific construction of the transformer according to this invention. Base plate 34 has a printed circuit in the necessary pattern 33 for constructing the oscillating circuit 30. Transistor 7a, transformer 5a, condenser 9, 22, resistor 23 and dumping diode 25 are mounted on the base plate 34. The cores 31, 32 of transformer 5a are attached to the base plate 34. For example, in the case of E type and I shaped cores, base plate 34 has a center hole 34a for inserting center 31a of core 31, and recesses 34b, 34c for inserting sides 31b, 31c of core 31 as shown in FIG. 8. Primary coil 2 and secondary coil 4 are wound on the center 31a of core 31 at upper and lower positions respectively, and I shaped core 32 is attached to the open side of E type core 31.

Heretofore, transformer 5a is constructed and then attached to the base plate 34, by means of parts such as a band, a screw, a bolt, and a nut. Therefore it needed attaching means and attaching steps in manufacturing. On the other hand, in the device according to this invention, the cores 31, 32 are integrally attached to and mounted on the base plate 34 before completing the assembly of transformer 5a, eliminating attaching means of said prior devices and the attaching steps.

This invention is not to be limited by the embodiments shown in the drawings and described in the description, which is given by way of example and not of limitation, but only in accordance with the scope of the appended claims.

I claim:

1. A DC-DC converter photographic flash lamp circuit device comprising:

a transformer having a primary coil and a high voltage secondary coil;

a high current gain transistor connected between a DC voltage source and said primary coil;

said high current gain transistor having its base connected to the earth - ground side of said secondary coil;

a diode connected to the base of said high current gain transistor and between said DC voltge source for protecting said high voltage gain transistor from reverse voltages produced by said primary coil;

a feedback capacitor connected across said high voltage secondary coil;

a charging circuit comprised of a rectifier and a large capacity condenser connected to the other side of said secondary transformer;

trigger circuit means comprised of a trigger transformer, trigger condenser and triggering contact switch connected to trigger a flash lamp and discharge said large capacity condenser through said flash lamp thereby emitting light.

2. The device according to claim 1 including a printed circuit board for attaching the electronic parts of said device; said printed circuit board forming the base for mounting said transformer.

3. The device according to claim 2 in which said transformer has primary and secondary coils independently wound and axially adjacent to one another on an E type core having arms integrally attached to a hole and slots formed in said printed circuit board to form a unitary construction.

* * * * *